United States Patent [19]

Semenuk et al.

[11] Patent Number: 5,996,535
[45] Date of Patent: *Dec. 7, 1999

[54] CAGE FOR LABORATORY ANIMAL

[75] Inventors: Michael D. Semenuk, Grasonville; Richard A. Norwood, Towson, both of Md.

[73] Assignee: CCR, LLC, Millsersville, Md.

[*] Notice: This patent is subject to a terminal disclaimer.

[21] Appl. No.: 09/226,570

[22] Filed: Jan. 7, 1999

Related U.S. Application Data

[63] Continuation-in-part of application No. 08/920,732, Aug. 29, 1997, Pat. No. 5,865,144.

[51] Int. Cl.[6] .................................................. A01K 7/00
[52] U.S. Cl. .......................................... 119/456; 119/493
[58] Field of Search .................................... 119/416, 417, 119/418, 419, 456, 458, 493, 500

[56] References Cited

U.S. PATENT DOCUMENTS

| | | | |
|---|---|---|---|
| Re. 32,113 | 4/1986 | Harr | 119/15 |
| D. 351,259 | 10/1994 | Semenuk et al. | D30/119 |
| D. 383,253 | 9/1997 | Semenuk et al. | D30/120 |
| 2,467,525 | 4/1949 | Fricke | 119/15 |
| 3,063,413 | 11/1962 | Fuller et al. | 119/18 |
| 3,397,676 | 8/1968 | Barney | 119/15 |
| 3,924,571 | 12/1975 | Holman | 119/15 |
| 4,085,705 | 4/1978 | Gland et al. | 119/17 |
| 4,154,196 | 5/1979 | Gass | 119/17 |
| 4,201,153 | 5/1980 | Nace | 119/3 |
| 4,402,280 | 9/1983 | Thomas | 119/15 |
| 4,435,194 | 3/1984 | Picard et al. | 55/96 |
| 4,480,587 | 11/1984 | Sedlacek | 119/15 |
| 4,526,133 | 7/1985 | LoMaglio | 119/17 |
| 4,528,941 | 7/1985 | Spengler | 119/15 |
| 4,798,171 | 1/1989 | Peters et al. | 119/15 |
| 4,844,018 | 7/1989 | Niki | 119/72.5 |
| 4,869,206 | 9/1989 | Spina | 119/17 |
| 4,940,017 | 7/1990 | Niki et al. | 119/18 |
| 4,989,545 | 2/1991 | Sheaffer et al. | 119/17 |
| 5,003,922 | 4/1991 | Niki et al. | 119/15 |
| 5,048,459 | 9/1991 | Niki et al. | 119/17 |
| 5,148,766 | 9/1992 | Coiro, Sr. et al. | 119/17 |
| 5,307,757 | 5/1994 | Coiro, Sr. et al. | 119/17 |
| 5,311,836 | 5/1994 | Sheaffer et al. | 119/17 |
| 5,400,744 | 3/1995 | Coiro, Sr. et al. | 119/72.5 |
| 5,865,144 | 2/1999 | Semenuk | 119/456 |

*Primary Examiner*—Thomas Price
*Attorney, Agent, or Firm*—Leonard Bloom

[57] ABSTRACT

A cage system for laboratory animal care has a plastic cage with a molded perforated-bottom, a snap-on plenum cage top, a cage top feeder lid and a snap on waste tray. The floor of the cage is shaped with rounded perforations and domed protrusions to deflect both liquid and solid waste down to the attached waste tray. A filtered air supply is introduced into the lid of the cage and passes through orifices in the bottom of the lid, flowing laminarly through the body of the cage and out perforations in the floor over the waste tray. A water supply system for the cage is provided. No bedding is required in the cage. The system is air tight and air in any one cage is isolated from air in all other cages in the system which can be mounted on a rack. A drain for liquids is provided in the waste tray. In an alternate embodiment, the cage has an imperforate floor. A plurality of cages are supported in a rack. Several configurations to support the cage within the rack are provided.

25 Claims, 13 Drawing Sheets

5,996,535

CAGE FOR LABORATORY ANIMAL

CROSS REFERENCE TO RELATED APPLICATIONS

The present invention is a continuation-in-part of application Ser. No. 08/920,732, filed Aug. 29, 1997, now U.S. Pat. No. 5,865,144.

BACKGROUND OF THE INVENTION

The present invention relates to caging systems for laboratory animal care and more particularly to a cage and system which has controlled ventilation, waste containment and does not require bedding.

Most all existing ventilated rodent cage systems are made with plastic solid-bottom cages. Clear cages are used so it is possible to inspect the condition of the inside of the cage without disturbing the animals. The cage ensemble generally consists of a metal wire bar lid containing a feed hopper and water bottle capabilities and a plastic top that holds a piece of filter media. The wire bar lid is convenient to use because feed and water bottles in a cage can be moved to a clean cage in one motion. The cages are contained in a rack that holds a plurality of cages either single or double sided. An automatic water system introduces water into the cage for the rodent using lixits or water valves located either outside or inside the cage. It must be monitored for proper water pressure and must be flushed periodically. Problems of leakage, high intracage humidity levels and cage flooding are associated with automatic watering systems. A plenum, either a separate duct system or made up of components of the rack (i.e. the shelves or the tubing uprights), supply the cage with filtered air through a cage mounted air supply diffuser. The front of the cage, perimeter of the cage lid and the cage body (where the leakage occurs) is open to the environment of the animal room. The air flow is either transversely across the cage or from an inlet in the side or top of the cage to an outlet in the junction of the top and body or top of the cage. A removable bottom portion for animal waste has been disclosed but air flow through the waste tray has not been reported.

Exhausted air is drawn either through a plenum system or into a "U" shaped metal exhaust collar surrounding three sides of each cage or a metal or plastic canopy. It is drawn into a horizontal exhaust manifold on each shelf, travels up the vertical exhaust plenum, then finally into a filtered exhaust system. This system, designed for limited capture of exhausted cage air, allows contaminated air to escape into the room from the cage lid perimeter and may present health problems for personnel. The systems scavenge room air and introduce air into the room, thus disturbing the macroenvironment. Present systems allow the pressurized air to blow any contaminants on the filter media into the room. Another type allows contaminants on the filter media to blow into the cage.

The applicant is aware of the following U.S. patents which are related to cages for laboratory animals:

| Inventor(s) | U.S. Pat. No. |
| --- | --- |
| Fricke | 2,467,525 |
| Fuller et al | 3,063,413 |
| Barney | 3,397,676 |
| Holinan | 3,924,571 |
| Gland et al | 4,085,705 |
| Gass | 4,154,196 |
| Nace | 4,201,153 |
| Thomas | 4,402,280 |
| Picard et al | 4,435,194 |
| Sedlacek | 4,480,587 |
| LoMaglio | 4,526,133 |
| Spengler | 4,528,941 |
| Peters et al | 4,798,171 |
| Niki | 4,844,018 |
| Spina | 4,869,206 |
| Niki et al | 4,940,017 |
| Sheaffer | 4,989,545 |
| Niki et al | 5,003,022 |
| Niki et al | 5,048,453 |
| Coiro, Sr. et al | 5,148,766 |
| Coiro, Sr. et al | 5,307,757 |
| Sheaffer et al | 5,311,836 |
| Harr | Re 32,113 |
| Semenuk | D 351,259 |
| Semenuk | D 383,253 |

Current ventilated caging systems, of which the applicant is aware, for laboratory animal care and use in biomedical research/testing is suboptimal because of the lack of environmental control. Also, animal activity over contact bedding material, husbandry techniques and laboratory procedures generate aerosols and allergens that spread through cage leakage into the work area and pose a risk of contamination to the animals and to the workers. In addition to suspension of particulates, chilling and dehydration of neonates, hairless and nude strains, existing ventilated racks have provoked animal losses due to hypothermia. While the systems currently in use may provide some biological exclusion and save labor, the use of bedding material, the lack of animal comfort, the leakage problem, and the high cost of maintenance pose serious problems in research.

In present systems, bedding and nesting materials are placed directly on the floor of the solid-bottom cages, since rodents are nesting and burrowing animals. The primary requirements of bedding materials are: (1) the material must not be harmful to the animal; (2) it must be capable of absorbing moisture without causing dehydration of newborn animals, (3) it must not create excessive dust, (4) it must be economical to use and dispose of. So far, existing bedding materials fail to achieve these standards. A major goal is eliminating the cost of bedding and bedding-related activities including bedding ordering, receiving, storage, dispensing, autoclaving, dust removal, bedding dumping, cage-scraping, bagging, disposal and finally removal of soiled bedding. Dispensing of used bedding can engender both problems of storage and aerosol contamination including allergen exposure. Expensive engineering and operation systems are required to prevent these problems. Modern bedding disposal systems are basically vacuums, which prevent contaminated particles from getting into the air that workers breathe. The location of such systems throughout a facility and the transportation of waste bedding are major operational expenses. Moreover as greater demands are put on available space, clean bedding storage add a burden to husbandry-related costs. Thus, there is a need for a laboratory animal cage and a system of cages which solve these problems.

BRIEF SUMMARY OF THE INVENTION

It is an object of the invention to provide a cage for laboratory animal care which has a laminar air flow from top to bottom to permit a healthy environment.

It is a further object of the invention to provide a cage for laboratory animal care which permits waste products to pass through the floor of the cage and requires no bedding in the cage.

It is still another object of the present invention to provide a cage for laboratory animal care which can exhaust excess water automatically preventing cage flooding.

It is yet another object of the present invention to provide a system of cages in a rack in which the air flow through each individual cage is controlled, adjustable by the user and there is no cross contamination between the cages.

It is still a further object of the present invention to provide a cage for laboratory animal care to permit optimal animal housing flexibility, protect animal and occupational health by providing a barrier at cage level for exclusion, containment or both, validate data reproducibility; and provide for optimal animal comfort and well-being. It will also avoid animal limb soreness and stiffness as found in wire bottom cages, promote rapid waste desiccation, eliminate waste contaminants accumulation, save husbandry-related costs, and convey a positive image to the public.

In accordance with the teaching of the present invention there is disclosed an animal cage for laboratory purposes. The cage has a floor means provided with a plurality of perforations formed therein, the perforations being interspersed with a plurality of upwardly-projecting convex projections to assure that the solid and liquid waste from the animal will substantially fall through the perforations in the floor means. The waste will not substantially cling to the floor means adjacent to the perforations. A removable waste tray is disposed below the floor to receive the animal waste.

In further accordance with the teachings of the present invention, there is disclosed a cage for laboratory animal care. The cage has a body having four walls and a perforated floor defining living space for the animal. A waste tray is detachably connected beneath the perforated floor of the body. A lid is removably connected to the body. There is provided means for circulating clean air through the cage. The cage is air tight.

Also, there is disclosed a cage for laboratory animal care. The cage has a body having four walls and a floor defining living space for the animal. A lid is removably connected to the body. An air inlet port is formed in the lid. An air outlet port is formed in one of the walls of the body. Means are provided to circulate air between the air inlet port and the air outlet port.

Additionally, there is disclosed a cage for laboratory animal care. The cage has a body having four walls and a perforated floor defining living space for the animal. A waste tray is detachably connected beneath the perforated floor of the body. The waste tray has an air outlet port formed therein. A lid is removably connected to the body, the lid having an air inlet port formed therein. A clean air supply is connected to the air inlet port wherein the clean air flows through the air inlet port, into the lid and the body, the clean air flowing laminarly downwardly through the living space for the animal, through the perforated floor, across the waste tray and out the air outlet port. The air flow removes from the cage, particulate matter, allergens and gases associated with waste products.

In another aspect, there is disclosed a ventilated cage system for laboratory animal care having at least one cage having a body. The body has a top and a bottom. A separate lid is connected to the top, an air inlet port being formed in the lid. A detachable waste tray is connected to the bottom, wherein each cage is air tight. An air outlet port is formed in the waste tray. A rack is provided for supporting the at least one cage. An air supply introduces air into the air inlet port in the lid. The air flows laminarly from the lid of each cage, through each cage, through the waste tray of each cage, and through the air outlet port of each waste tray. In this manner, fresh air is maintained in the at least one cage and waste air is removed from the at least one cage.

In still another aspect there is disclosed a cage system for laboratory animal care including at least one cage having a body having a top, four side walls and a perforated floor. A detachable waste tray is connected to the body beneath the perforated floor of the body. A lid is removably connected to the top of the body. A rack and means for supporting the at least one cage on the rack is provided.

These and other objects of the present invention will become apparent from a reading of the following specification taken in conjunction with the enclosed drawings.

DESCRIPTION OF THE PREFERRED EMBODIMENTS

Figure 1:
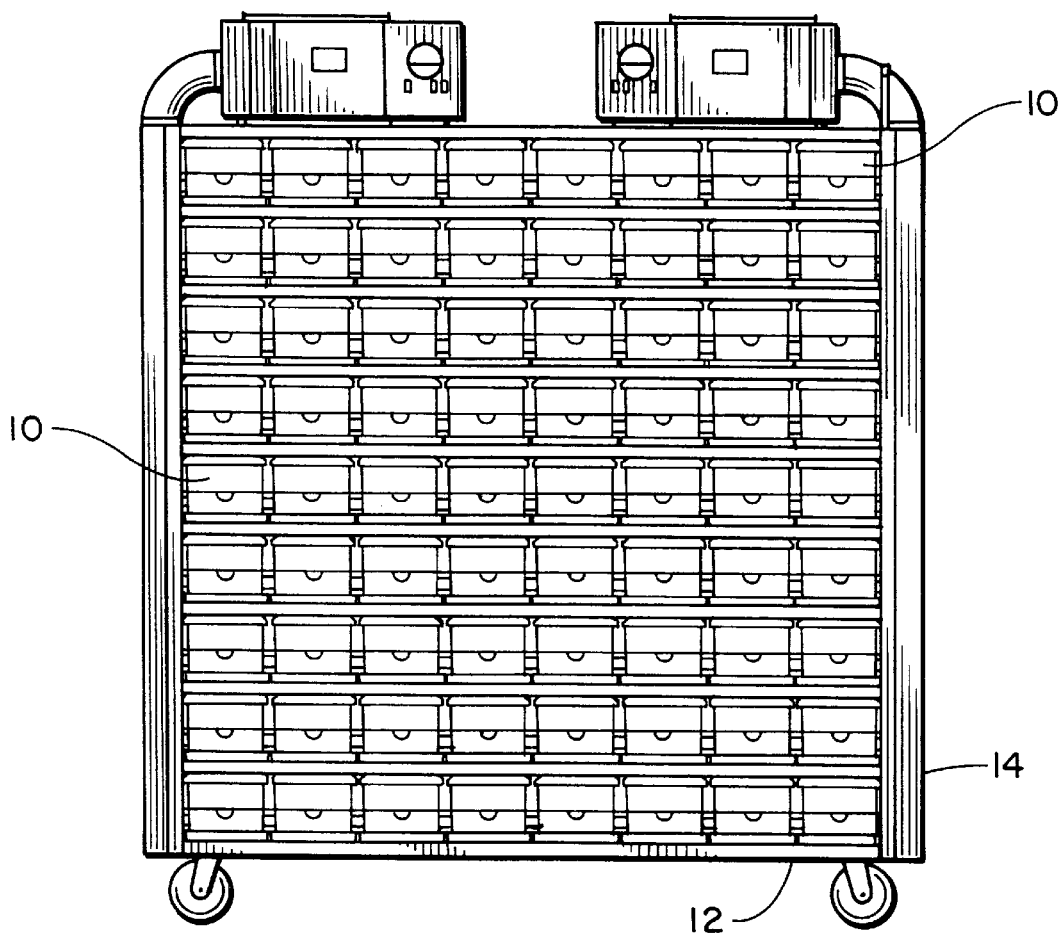
FIG. 1 is a front elevation view of a rack in which are mounted a plurality of cages for laboratory animal care of the present invention.

Referring now to FIGS. 1–5, a plurality of cages 10 are supported on a rack 12. Preferably, the rack 12 is a frame mounted on wheels with a plurality of cage suspension brackets having one or more cages 10 on each bracket.

Each cage 10 is individually connected to an air supply 14 which serves all of the cages 10 in the rack 12. A filter 16 is provided in the air supply. The filter may be a HEPA filter and may also include a prefilter. A blower 20 is disposed in the air supply system to move the air through the cages 10 and the filter 16. The filtered air enters a manifold 18 which is connected by hoses to the individual cages 10. The filter system removes particulate matter and pathogens larger than 0.003 microns in size.

Each cage 10 has a body 22 having four walls and a bottom surface 24 to define a living space for the laboratory animals. A separate lid 26 is removably connected to the top of each body 22. An air inlet port 28 is formed in each lid 26. The bottom surface of each lid 26 has a plurality of spaced-apart orifices 30 formed therein. Preferably, the orifices are distributed over the entire area of the bottom surface of each lid 26.

It is preferred that all corners and the intersections of walls and bottom surface of the cage be rounded to reduce the accumulation of dirt and waste and to facilitate cleaning of the cage. It is preferred that the body of the cage be made of high temperature plastic and that the cage be transparent to permit observation of the animal within the cage.

It is preferred that a feeder plate 32 be disposed between the lid 26 and the body 22 of each cage 10. The feeder plate 32 may be a frame structure which has an angled portion 34 which extends downwardly into the living space of the animal within the body 22 of the cage. The angled portion 34 may have a "V" shape. The feeder plate may be metal or plastic. The feeder plate 32 supports containers of food, water and/or special liquid supplements 38 for the animal. The perforated feeder plate 32 also optimally acts as an air diffuser creating a plenum when coupled with the lid 26.

Figure 8:
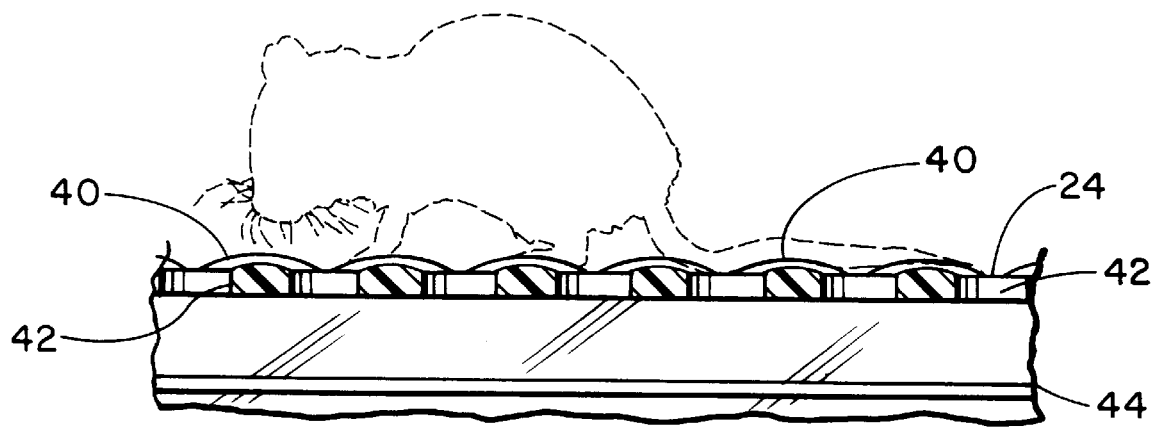
FIG. 8 is a cross-section view of a portion of the bottom of the cage along the lines 8—8 of FIG. 7 showing an animal in the cage.
Figure 7:
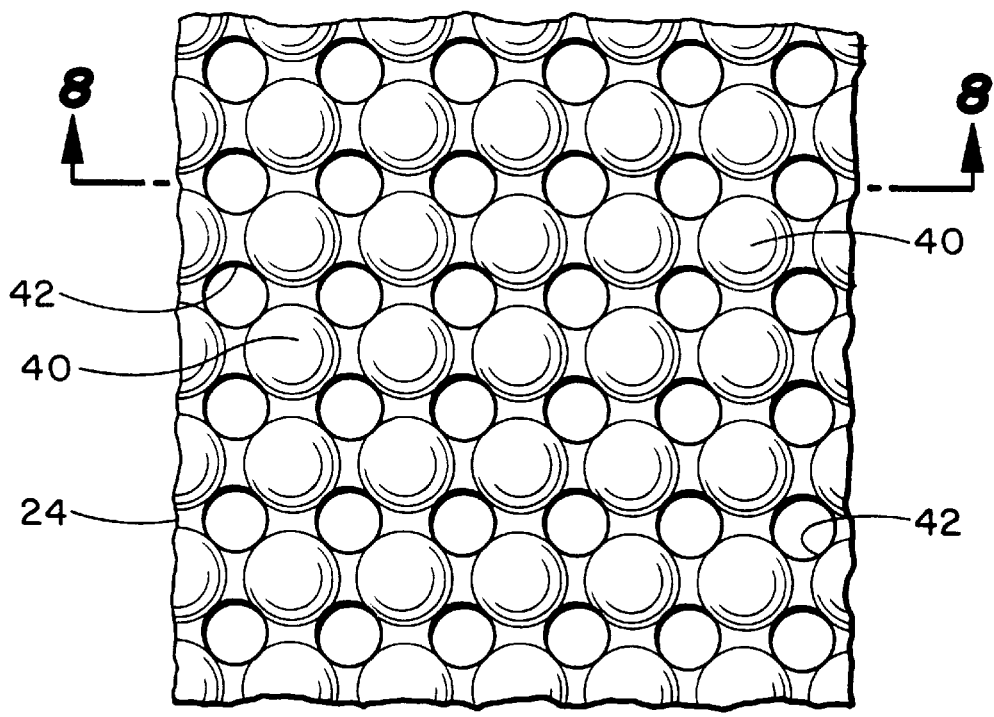
FIG. 7 is a top plan view of a portion of the bottom of the cage.

The body surface (or floor) 24 of the cage 22 is perforated. The floor 24 is formed having a plurality of spaced-apart raised domes 40. Each dome is disposed among a plurality of spaced-apart perforations 42 (FIGS. 7 and 8). Although not limited to these sizes, it has been found that a satisfactory floor has domes 40 which are approximately 0.5 inches in diameter and approximately 3/32 inch in height above the surface of the floor. The perforations 42 are approximately 5/16 inch in diameter. Solid and liquid waste from the animal is deflected from the domes 40 and through the perforations 42 into the waste tray 44. The floor 24 of the present invention replaces wire floors as used in cages of the prior art and solves problems which were caused by the wire floors such as injury to the feet of the animals.

Figure 6:
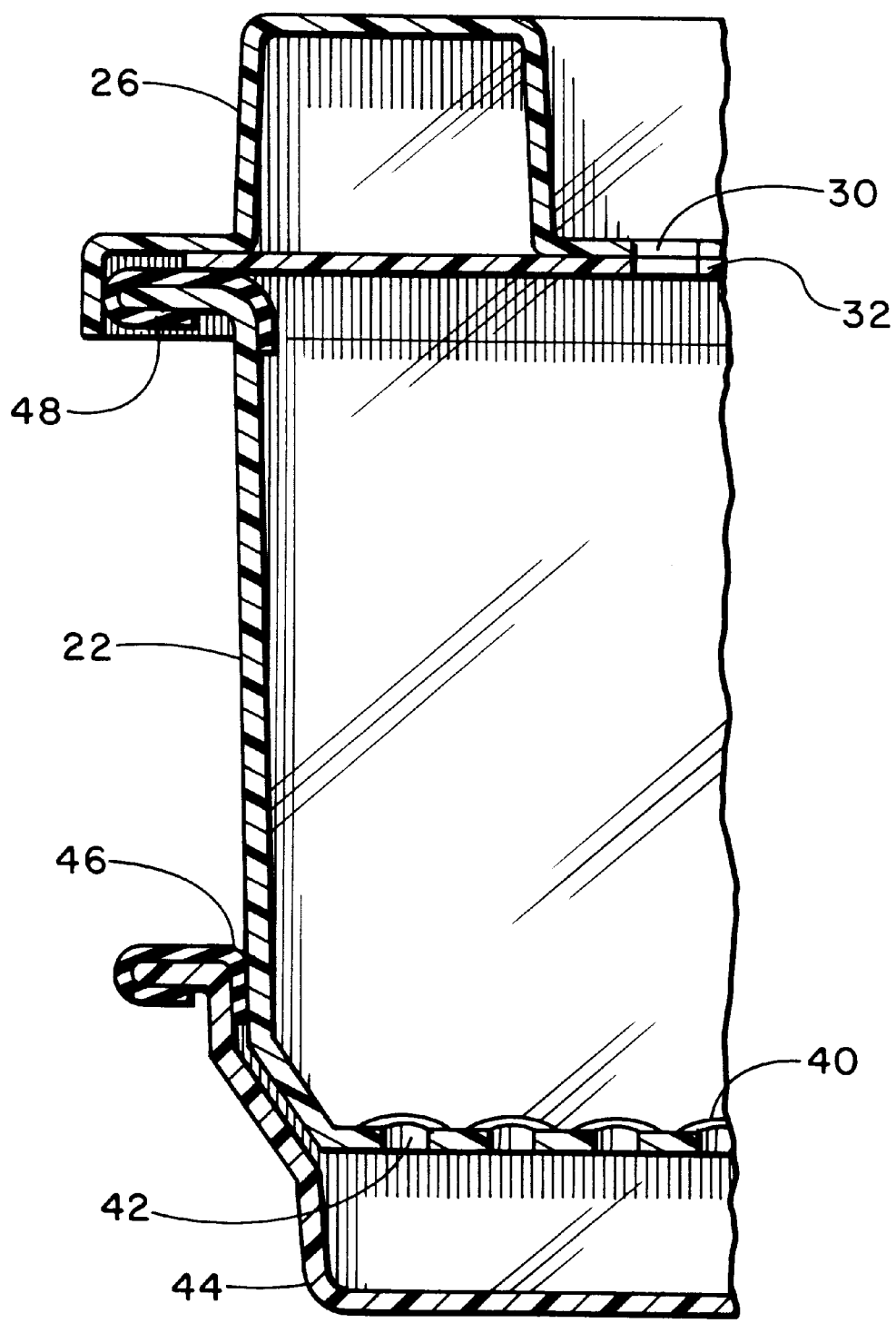
FIG. 6 is a partial cross section view of the cage showing the sealant means.

The waste tray 44 is a tray having walls and a bottom which covers the entire bottom surface 24 of the cage 10. Preferably, a gasket 46 is fitted between the waste tray 44 and the body 22 of the cage 10 and another gasket 48 between the lid and the body 22 of the cage 10 (FIG. 6). The waste tray 44 is attached onto the cage 10 and is easily installed and removed by applying pressure on the waste tray 44 to snap on and off over the gasket 46. In this manner the waste tray 44 can be easily replaced with a clean tray saving costly man hours. The gasket 48 and 46 may be any sealable closure between the body 22 and the lid 26 and the body and the waste tray. By use of similar sealing techniques known to persons skilled in the art, each cage system is air tight and the air flow within each cage is restricted to the specific cage. There is no leakage of air from any cage into the room in which the cage is housed nor is there any air interchange between any cages. Cage to cage contamination is prevented.

Figure 2:
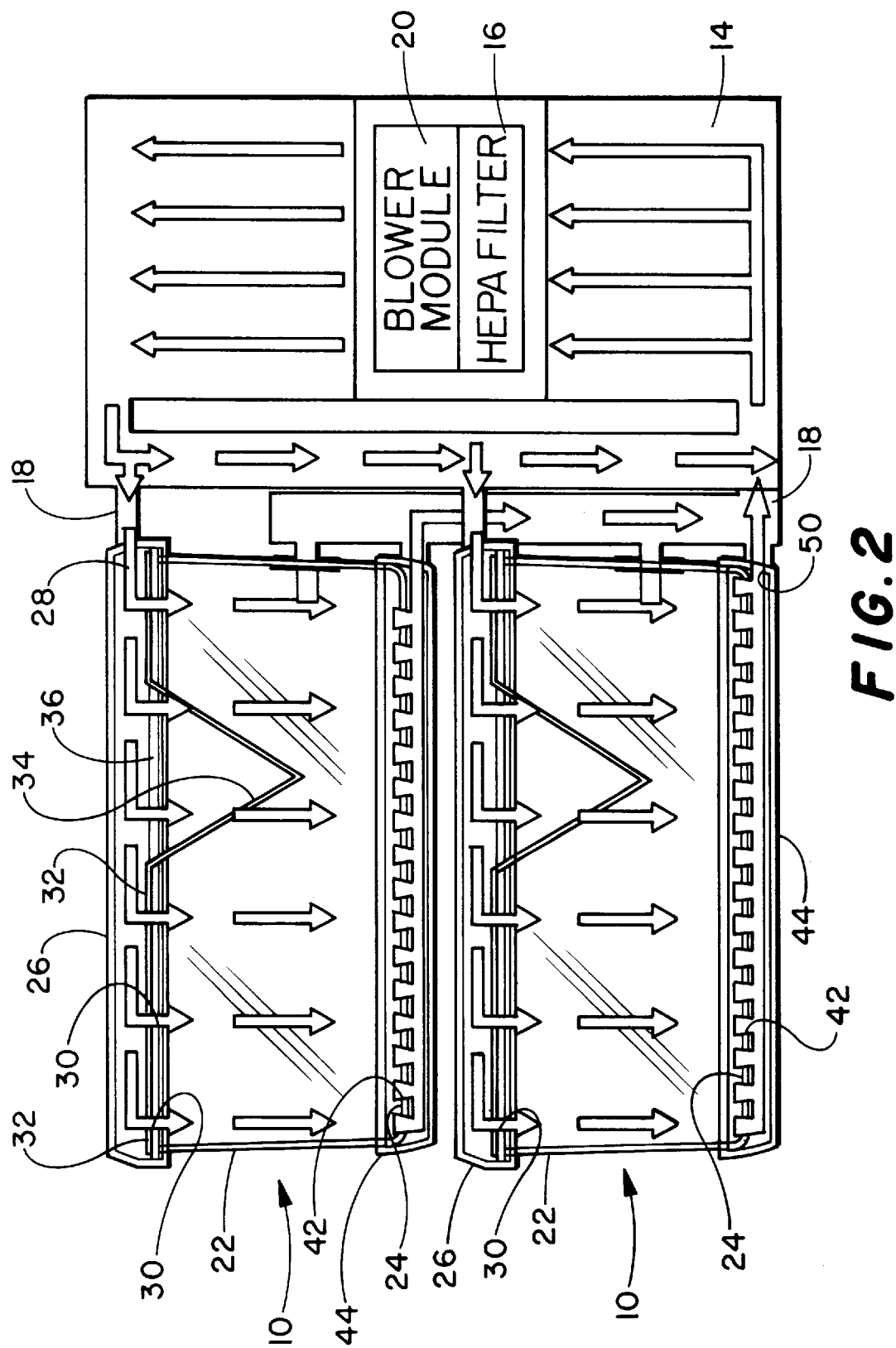
FIG. 2 is a side elevation view of two cages mounted vertically and connected to the air supply system.
Figure 3:
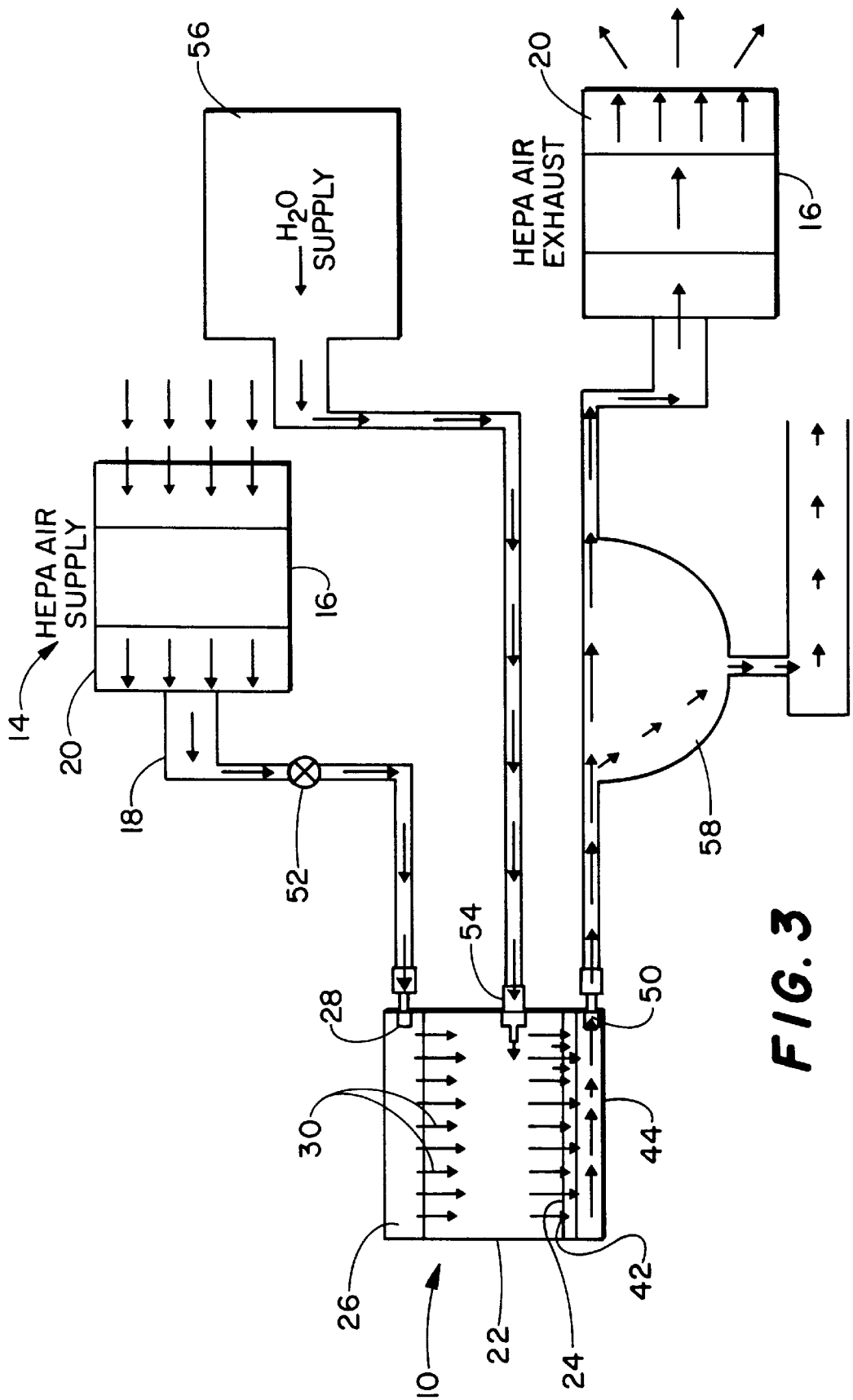
FIG. 3 is a schematic diagram of the ventilated cage system of the present invention.
Figure 4:
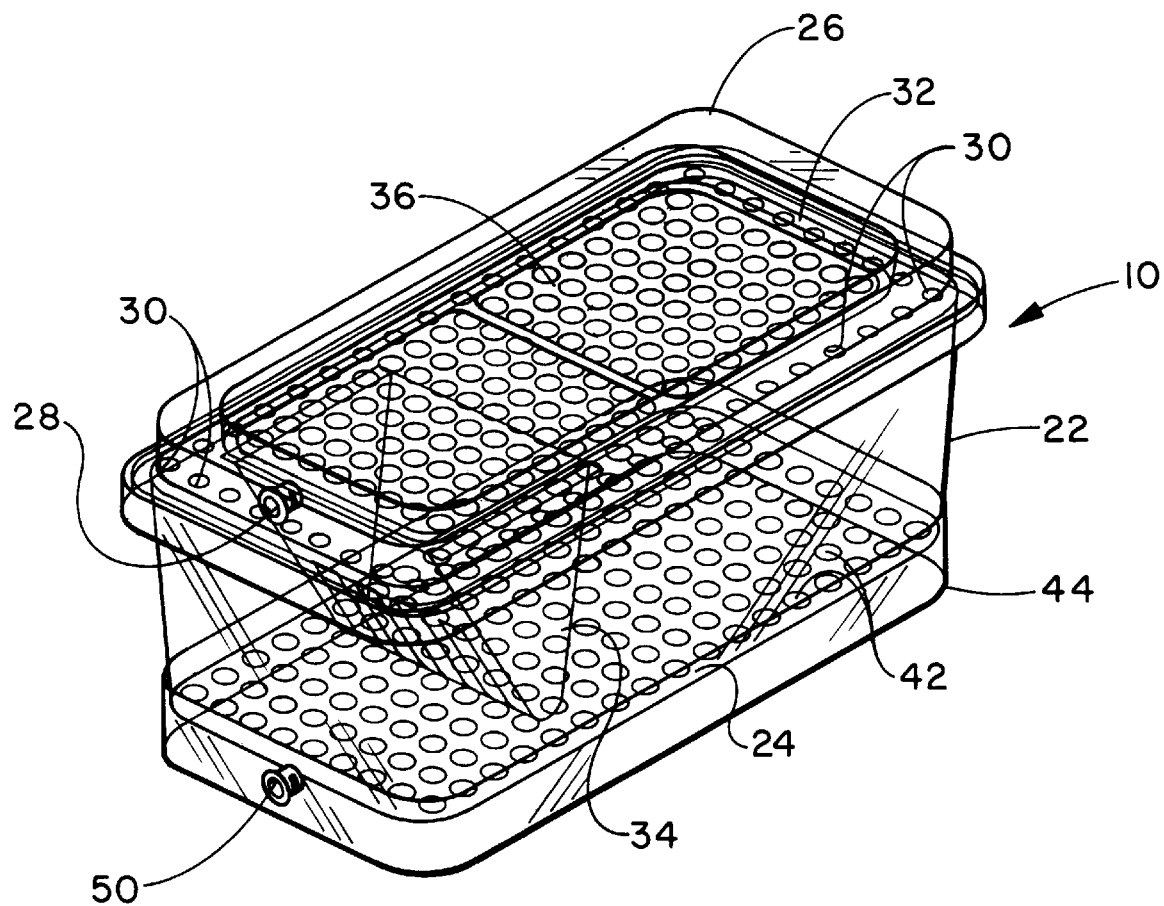
FIG. 4 is a perspective view of the cage.
Figure 5:
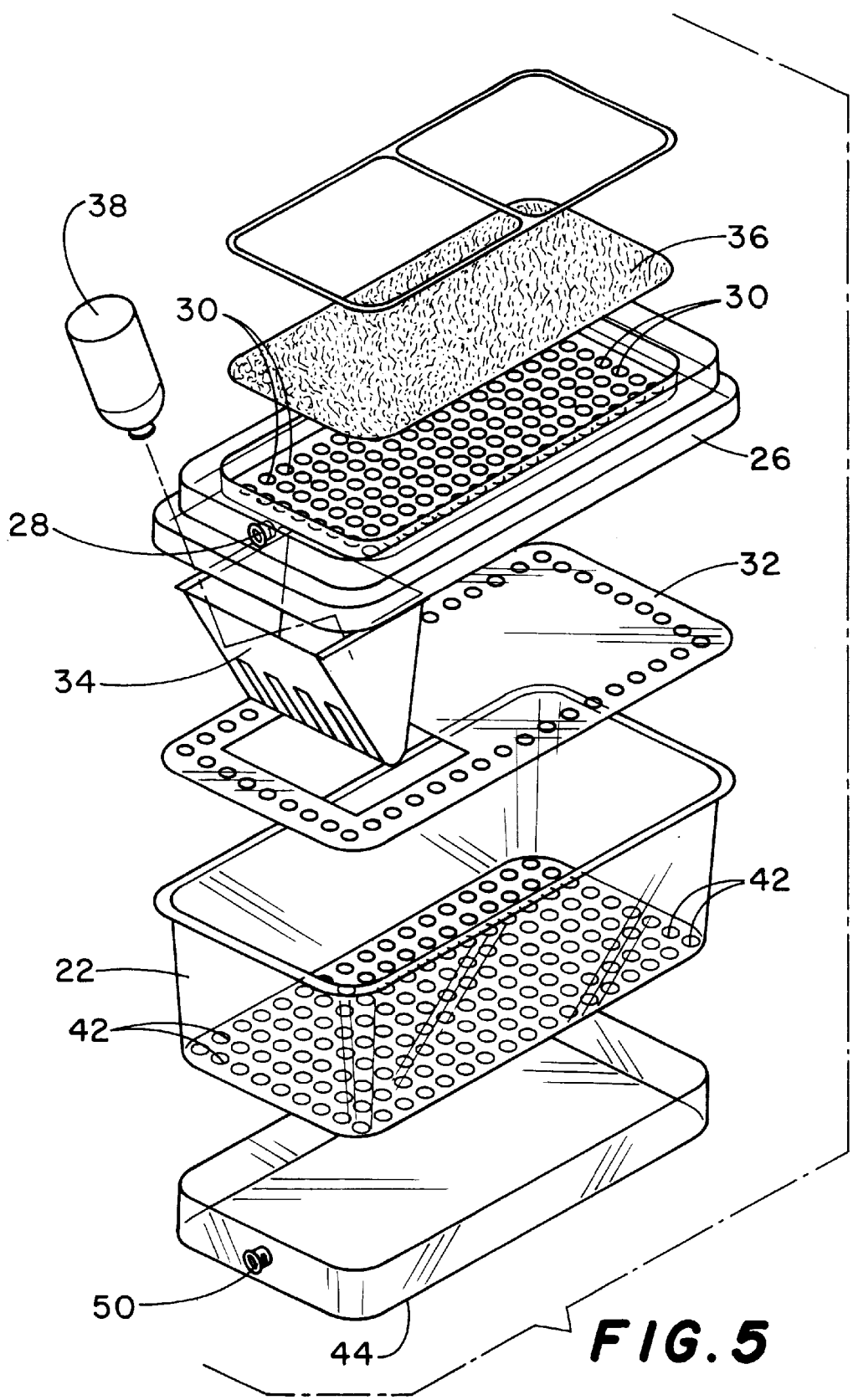
FIG. 5 is an exploded view of the cage.

The waste tray 44 further has an outlet port 50 formed therein through which the air exiting the cage 10, may flow. Also, water or liquid waste products from the animal may exit from the outlet port 50. The waste air, after flowing out of the outlet port 50 is directed preferably through a hose, to the exhaust filter 16 and the particulates and toxic gases are removed. Air is then resupplied through the inlet filter 16 to the cage system under an approximately neutral to slightly positive pressure. An adjustable blower 52 in the air supply system is used to control the rate of air flow as needed depending upon the desired conditions and the strain of animal within the cage. Due to the configuration of the cage system and the perforated lid 26 and perforated floor 24 of the individual cage, the air flow through each cage is laminar from the top of the cage to the bottom of the cage (FIGS. 2 and 3). In this manner, the animal is continuously provided with fresh air. The air, after passing through the body 22 of the cage 10, sweeps over any waste products which may be in the waste tray 44 and removes ammonia and other vapors from the system.

A water valve 54 is fitted into the body 22 of the cage 10 and is connected to a water supply 56. The water valve 54 may be manually or automatically controlled to supply the animal with water. The perforated floor 24 of the cage and the outlet port 50 of the waste tray 44 permit the water to drain from the cage and prevent flooding. The excess water flows to a reservoir 58 and to a drain to be removed from the system.

FIG. 3 diagrammatically depicts the air flow in the system by arrows having longer shafts and the water flow by arrows having shorter shafts.

The cages 10 may be made in a variety of sizes to accommodate laboratory animals of varying sizes.

The intracage airflow system serves as an effective barrier system by preventing the transmission of contaminated particulates and aerosols from cage-to-cage and rack-to-rack. The system uses airflow to prevent or control airborne infection of laboratory animals. The flow of air sweeps the bedding-free cage of gases, particulate matter, allergens and other contaminants down into the attached waste tray, keeping the cage environment cleaner than other filtered air cage designs. The HEPA filter (both supply and exhaust) is connected to a baffling system which reduces turbulence and directs the airflow into a distribution plate. This plate houses the connections for the flexible tubing that act as a plenum and either delivers or exhausts air from each cage. Preferably, each tube is of equal length thus supplying or exhausting each cage the same no matter where it is located on the rack. Each tube is housed in a hollow shelf and preferably terminated at the cage with a stainless steel nipple. The air flow to each individual cage is automatically balanced to provide approximately the same air flow into each cage in the system. This may be accomplished by controlling the lengths of the tubing, baffles, varying duct size and other means known to persons skilled in the art.

Figure 9:
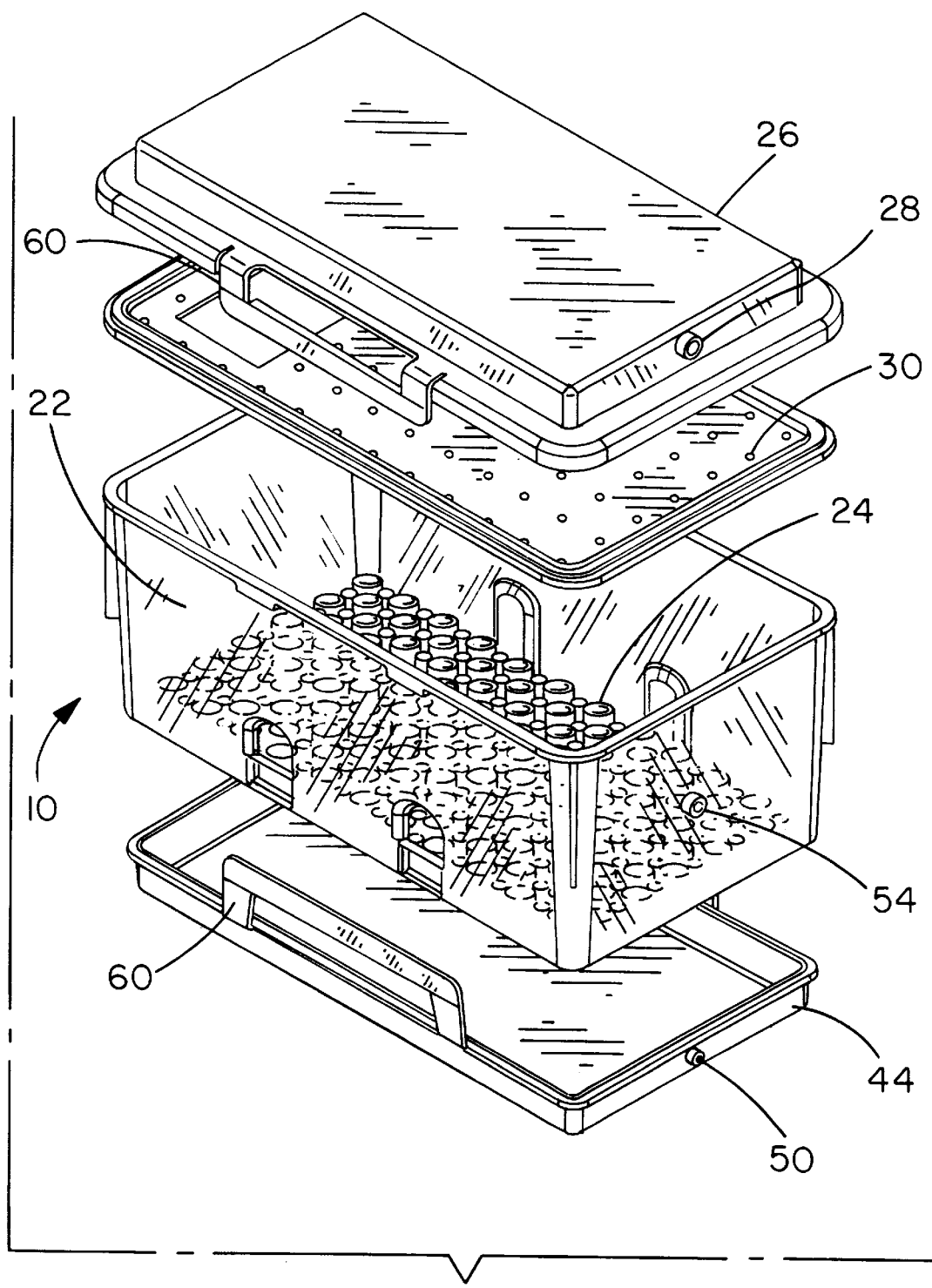
FIG. 9 is a perspective exploded view of a cage of an alternate embodiment viewed from the top.
Figure 10:
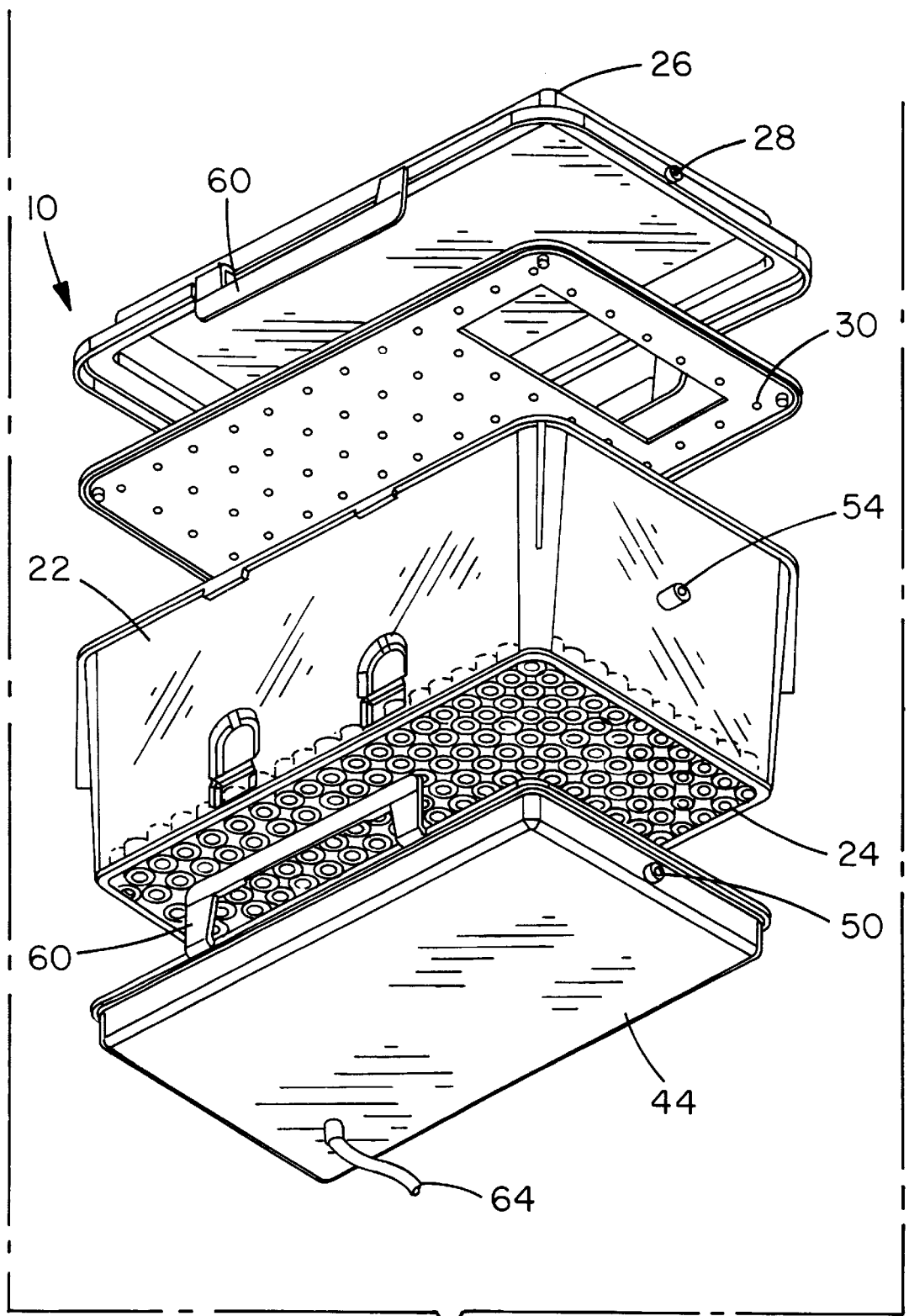
FIG. 10 is the embodiment of FIG. 9 viewed from the bottom.
Figure 11:
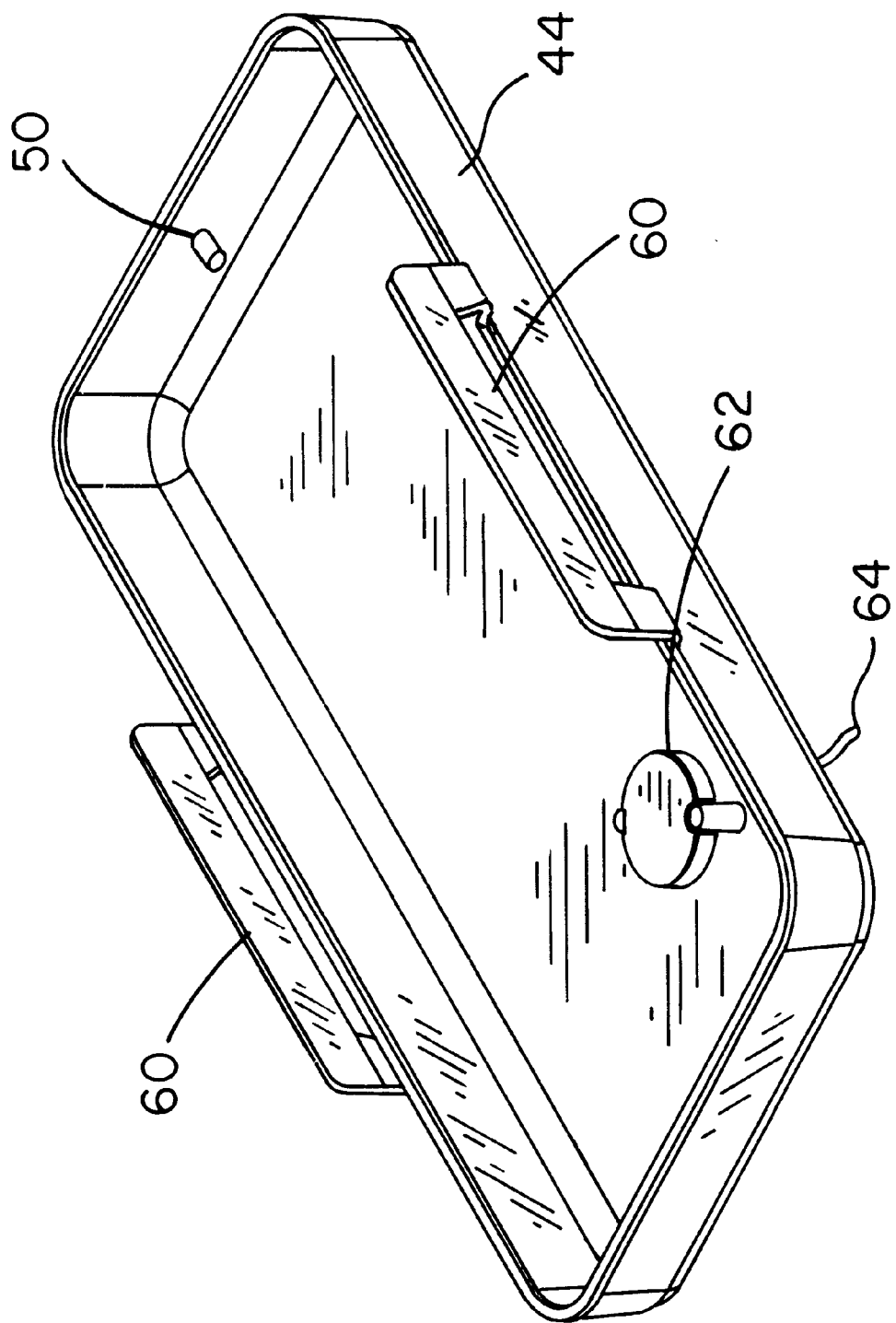
FIG. 11 is a perspective view of the waste tray showing the water overflow valve formed thereon.

FIGS. 9 and 10 show another embodiment of the cage 10. The body 22 has four walls and a perforated floor 24 to define the living space for the laboratory animal. A lid 26 is removably connected to the top of the body 22 and a waste tray 44 is detachably connected to the body 22 beneath the floor 24. An air inlet 28 is formed in the lid and an air outlet 50 is formed in the waste tray 44. Preferably, the bottom surface of the lid 26 has a plurality of spaced-apart orifices 30 formed therein to facilitate laminar flow of the air through the cage 10. A water valve 54 is formed in one of the walls of the body 22. The cage 10, preferably is formed of a transparent plastic. Thus, the embodiment of FIGS. 9 and 10 is very similar to the embodiment of FIGS. 4 and 5. However, the feeder preferably is omitted from the embodiments of FIGS. 4 and 5, although it could be included. The lid 26 and the waste tray 44 have handles 60 formed thereon to assist in removing and attaching the lid 26 and the waste tray 44 from the body 22. Also, it is preferred that the waste tray 44 has a water overflow outlet 62 formed therein to drain water and liquid waste from the waste tray 44 (FIG. 11). It is preferred that the water overflow outlet operate automatically so that there is very little accumulation of liquid in the waste tray 44. If desired, a tube or hose 64 may be connected to the water overflow outlet 62 externally of the waste tray 44 to direct the water and waste liquid to a collector (not shown).

Figure 12:
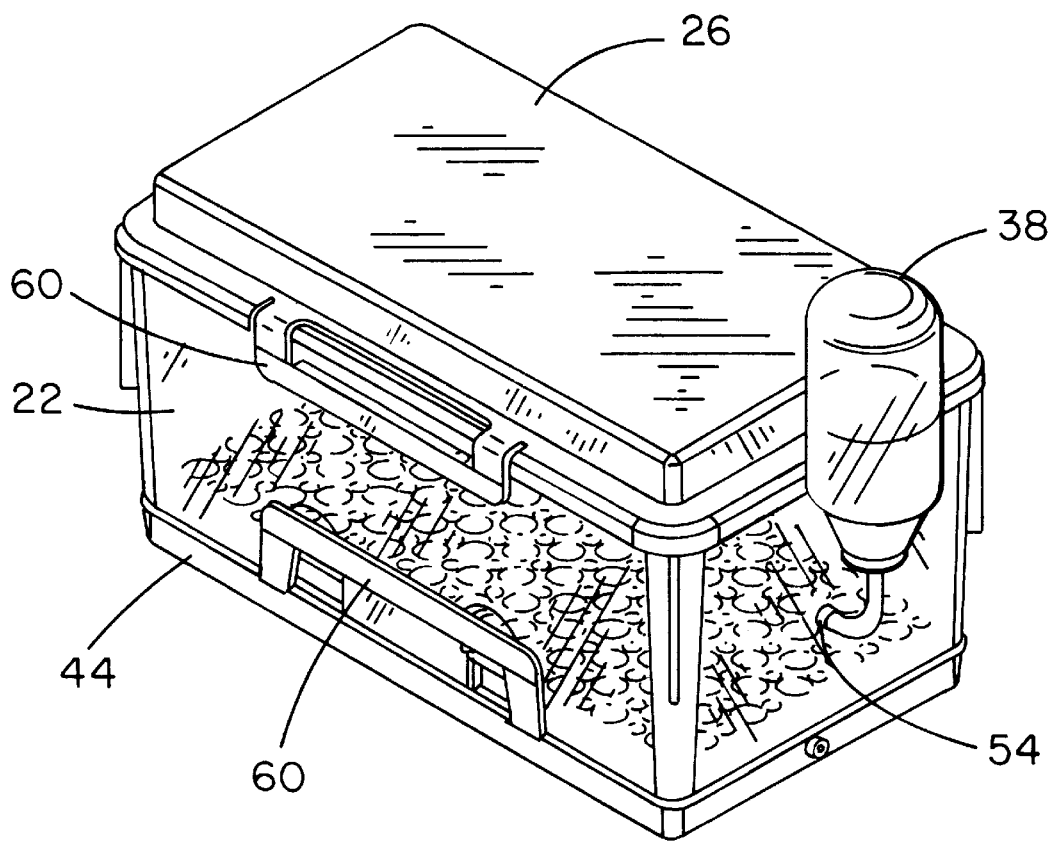
FIG. 12 is a perspective view of the cage with a water bottle attached externally.

As previously described, the cage 10 has a source of water 56 connected to the water valve 54 to provide automatic water feed to the laboratory animal. As shown in FIG. 12, a water bottle 38 may be connected to the water valve 54 where the water bottle 38 is external to the cage 10. This arrangement permits the water to be replenished when necessary without opening the cage 10. Each cage 10 may be disposed in the rack 12 with the respective water valve 54 directed outwardly from the rack 12 such that each externally connected water bottle 38 is readily accessible to an attendant. This construction is especially useful for situations where special diets or additives in the water are provided to the laboratory animals and the water bottles are easily and rapidly accessible.

Figure 13:
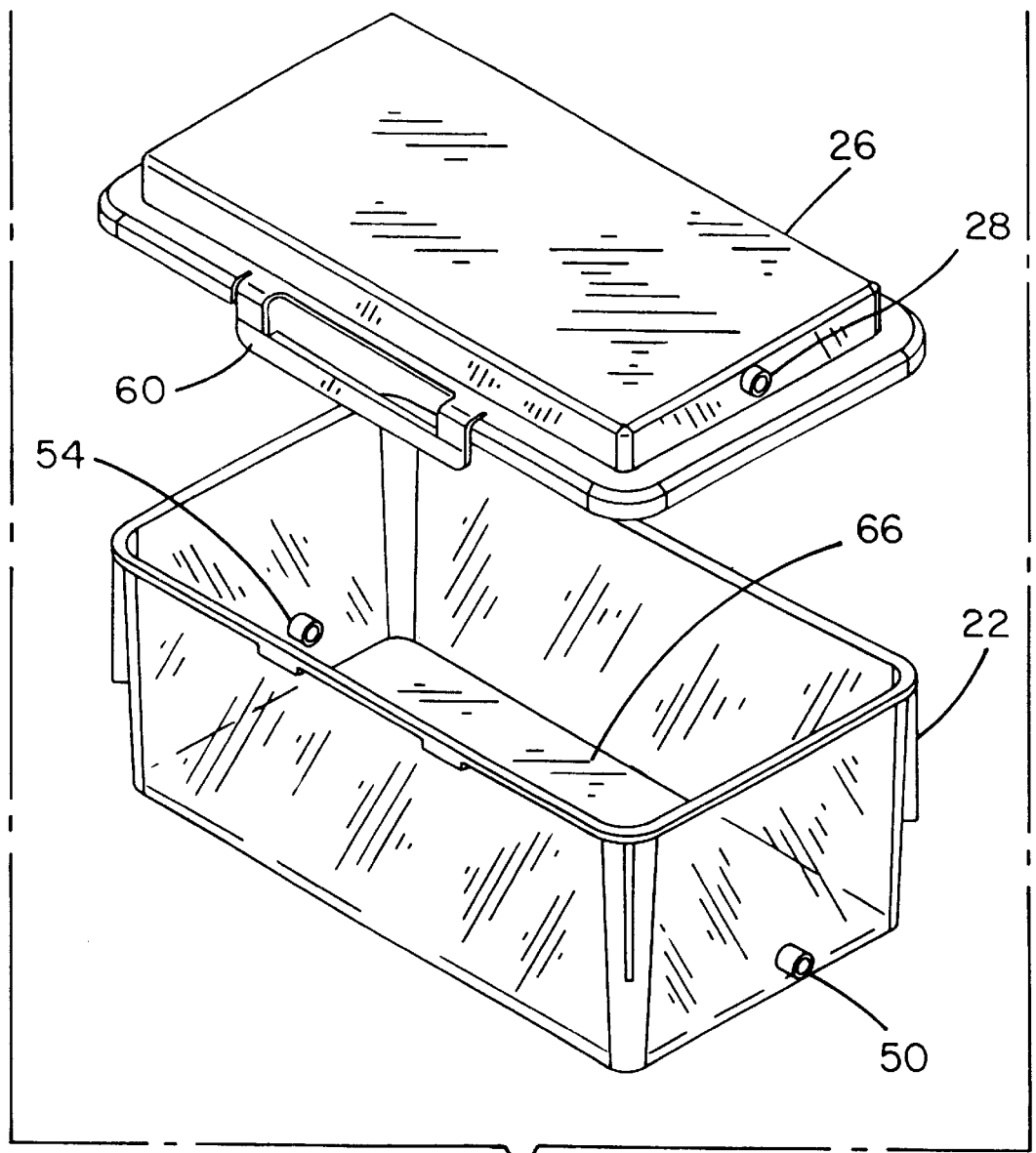
FIG. 13 is an exploded perspective view of another embodiment of the cage with a non-perforated floor.

In another embodiment and as shown in FIG. 13, the floor 66 is imperforate and consequently, has no detachable waste tray. A separate lid 26 is removably connected to the top of the body 22. An air inlet port 28 is formed in the lid 26 and an air outlet port 50 is formed in one of the walls of the body 22. Preferably, the air outlet port 50 is located close to the floor 66. The air flow pattern within the cage, preferably, is across the top in the lid and downwardly throughout the cage. Thus, fresh air is provided throughout the cage and vapors from waste products are exhausted out of the air outlet port 50. In this embodiment, the water valve 54 is preferably in a wall of the body 22 opposite from the wall in which the air outlet port is located. This is because air supply and air exhaust are constructed in plenums internally in the rack 12 to be centralized to all cages 10 and each cage is placed in the rack 12 with the air inlet port 28 and the air outlet port 50 on each cage adjacent to and connected to the plenums. By having the water valve 54 on a wall opposite from the air inlet and air outlet valves, the externally connected plurality of water bottles 38 are arranged outwardly of the rack for ready access by the attendant.

Figure 14:
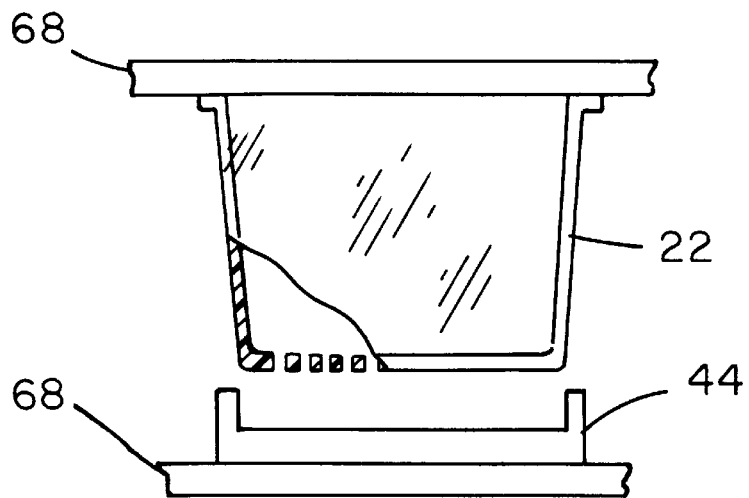
FIG. 14 is a partial cross-section end view showing the cage supported on the rack with the lid removed and the waste tray detached.
Figure 15:
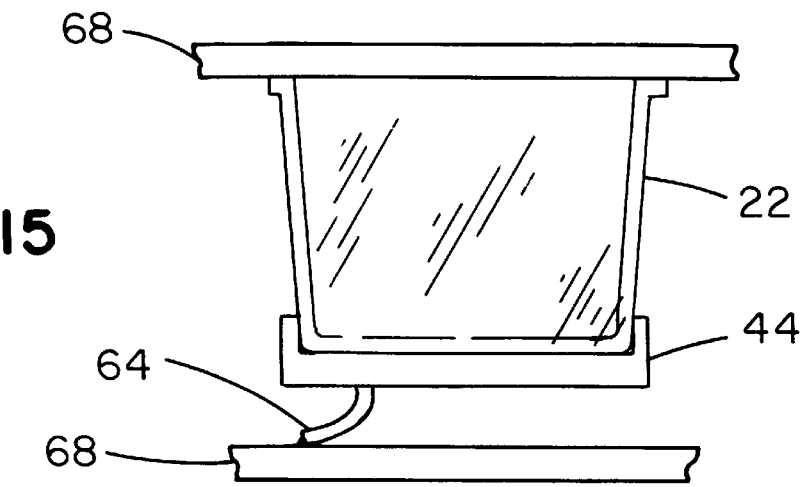
FIG. 15 is an end view showing the cage supported from the rack with the lid removed.
Figure 16:
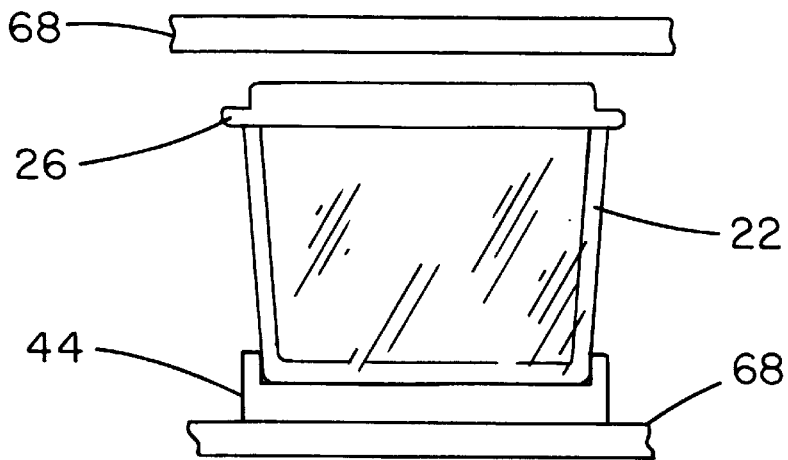
FIG. 16 is an end view showing the waste tray and lid attached to the body and the waste tray supported on the rack.

The cages 10 of the present invention may be supported in the rack 12 in several ways (FIGS. 14–16). The lid 26 is removed and the top of the body 22 may be attached to a shelf 66 of the rack using tracks, clips or other means known to persons having ordinary skill in the art. The waste tray 44 is separated from the body 22 and the spaced-apart waste tray 44 is supported on the shelf 68 directly beneath the floor of the suspended body 22 (FIG. 14). Alternately, the body 22 may be supported from the shelf 68 and the waste tray 44 remain detachably connected to the body 22 (FIG. 15). In this configuration, the hose 64 from the water overflow outlet 62 is readily directed to a collection container (not shown). In still another configuration (FIG. 16), the cage with the lid 26 and waste tray 44 attached, is supported by a shelf 68 beneath the cage 10 without contacting the shelf 68 above the cage 10, such that the waste tray is directly supported by the shelf beneath the cage.

Devices may be secured (snap-on) to the perforated floor. These devices are made from appropriate non-toxic material that favors isolation, nest building and thigmotactic behaviors, as well as providing protective or escape mechanisms for submissive animals. The bedding-free environment prevents the secondary dust problem of using conventional bedding material. Additionally, the elimination of bedding results in considerable cost savings. A central HEPA filtering unit may be mounted on each rack, room mounted to supply several racks or centrally located in a facility to supply many rooms with racks. These systems are all equipped with visual and audible alarms and monitors to alert facility personnel of problems or failures of air flow, temperature, humidity, water leakage, or filters. A battery-operated power supply system can be provided in the event of a power failure.

In summary, the cage system of the present invention provides the following unique features:

bedding free cage uses a perforated floor a plenum lid the lid has spaced-apart orifices for air flow an adjustable blower to vary the air supply and exhaust unit can accommodate various animal strains by user adjusted airflow separates air and water from the exhaust (prevents cage flooding)

air is supplied into top of cage and removed at bottom. Air flow direction is laminarly downward.

a snap-on waste tray is provided closed system maintains an approximately neutral pressure in the cage airflow is delivered and exhausted via a unique distribution system which automatically balances the airflow in each cage maintains and monitors temperature and humidity at cage level snap-on enrichment devices battery back-up for the HEPA unit monitors and alarms when problems occur centralized air supply at room or facility level uses non-toxic material or devices for nesting sealed cages a water valve connected to a source of water a water bottle external to the cage connected to the water valve water and waste liquid automatically drain from the waste tray alternate means for supporting the cages in the rack.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In an animal cage for laboratory purposes, the improvement wherein the cage has a floor means provided with a plurality of perforations formed therein, the perforations being interspersed with a plurality of upwardly-projecting convex projections to assure that the solid and liquid waste from the animal will substantially fall through the perforations in the floor means and will not substantially cling to the floor means adjacent to the perforations, and a removable waste tray disposed below the floor to receive the animal waste.

2. The animal cage of claim 1, wherein the cage is a substantially air tight ventilated cage and the ventilating air is in communication with the waste tray.

3. The animal cage of claim 1, wherein the cage has a lid removably connected thereto.

4. The animal cage of claim 1, further comprising a water valve fitted into a wall of the cage.

5. The animal cage of claim 4, wherein a water bottle is connected to the water valve externally of the cage such that water is available to the animal within the cage.

6. The animal cage of claim 1, wherein the cage is formed of transparent material.

7. A cage for laboratory animal care, the cage comprising:
   a body having four walls and a perforated floor defining living space for the animal,
   the perforated floor having plurality of perforations formed therein, the perforations being interspersed with a plurality of upwardly-projecting convex projections,
   a waste tray detachably connected beneath the perforated floor of the body,
   a lid removably connected to the body,
   means for circulating clean air through the cage, and the cage being air tight.

8. A cage for laboratory animal care, the cage comprising:
   a body having four walls and a perforated floor defining living space for the animal,
   a waste tray detachably connected beneath the perforated floor of the body, the waste tray having an air outlet port formed therein,
   a lid removably connected to the body, the lid having an air inlet port formed therein, and
   a clean air supply connected to the air inlet port wherein the clean air flows through the air inlet port into the lid and the body, the clean air flowing laminarly downwardly through the living space for the animal, through the perforated floor, across the waste tray and out the air outlet port, the air flow removing from the cage, particulate matter, allergens and gases associated with waste products.

9. The cage of claim 8, wherein the perforated floor has a plurality of raised domes, each dome disposed among a plurality of surrounding perforations wherein solid and liquid waste are deflected from the domes through the plurality of surrounding perforations into the waste tray, there being no bedding to trap the waste, and wherein the laboratory animal within the cage is not housed with the waste.

10. The cage of claim 8, further comprising a water valve formed in one of the walls of the cage, the water valve being connected to an external source of water for providing water to the laboratory animal.

11. The cage of claim 10, wherein a water bottle is connected to the water valve externally of the cage.

12. The cage of claim 8, further comprising a water overflow outlet formed in the waste tray, wherein liquid waste and water are drained from the waste tray.

13. The cage of claim 8, wherein the cage may be mounted in a rack for supporting the cage, the rack further having means to support a plurality of cages.

14. The cage of claim 8, wherein the cage is formed of a transparent material.

15. A cage for laboratory animal care, the cage comprising:
   a body having four walls and a floor defining living space for the animal,
   a lid removably connected to the body,
   an air inlet port being formed in the lid,
   an air outlet port formed in one of the walls of the body,
   means to circulate air between the air inlet port and the air outlet port.

16. The cage of claim 15, wherein the floor is imperforate.

17. The cage of claim 15, further comprising a water valve formed in one of the walls of the body, the water valve being connected to an external source of water.

18. The cage of claim 17, wherein a water bottle is connected to the water valve externally of the cage.

19. A ventilated cage system for laboratory animal care comprising:
   at least one cage having a body having a top and a bottom, a separate lid connected to the top, an air inlet port being formed in the lid,
   a detachable waste tray connected to the bottom, wherein each cage is air tight, an air outlet port formed in the waste tray,
   a rack for supporting the at least one cage,
   an air supply introducing air into the air inlet port in the lid, the air flowing laminarly from the lid of each cage, through each cage, through the waste tray of each cage, and through the air outlet port of each waste tray wherein fresh air is maintained in the at least one cage and waste air is removed from the at least one cage.

20. The cage system of claim 19, wherein the body of the at least one cage has a perforated floor.

21. The cage system of claim 19, further comprising the lid having a bottom surface, the bottom surface having a plurality of orifices formed therein wherein the air flow through the cage is uniformly distributed.

22. A cage system for laboratory animal care comprising:
   at least one cage having a body having a top, four side walls and a perforated floor,
   the perforated floor having a plurality of perforations formed therein, the perforations being interspersed with a plurality of upwardly-projecting convex projections;
   a detachable waste tray connected to the body beneath the perforated floor of the body,
   a lid removably connected to the top of the body,
   a rack and means for supporting the at least one cage on the rack.

23. The cage system of claim 22, wherein the lid is removed and the top of the body is attached to the rack.

24. The cage system of claim 23, wherein the waste tray is detached from the body and supported on the rack spaced apart from, and beneath, the floor of the body.

25. The cage system of claim 22, wherein the waste tray is connected to the body and the waste tray is directly supported on the rack.

* * * * *